United States Patent
Lin

(10) Patent No.: US 8,800,459 B2
(45) Date of Patent: Aug. 12, 2014

(54) RUDDER RESISTANCE REDUCING METHOD

(76) Inventor: Zuei-Ling Lin, Taipei (TW)

(*) Notice: Subject to any disclaimer, the term of this patent is extended or adjusted under 35 U.S.C. 154(b) by 294 days.

(21) Appl. No.: 13/208,575

(22) Filed: Aug. 12, 2011

(65) Prior Publication Data

US 2013/0036964 A1   Feb. 14, 2013

(51) Int. Cl.
*B63B 1/38* (2006.01)

(52) U.S. Cl.
USPC ............................................. 114/67 A

(58) Field of Classification Search
USPC .......................................... 114/67 A
See application file for complete search history.

(56) References Cited

U.S. PATENT DOCUMENTS

| | | | | |
|---|---|---|---|---|
| 3,680,511 A | * | 8/1972 | English | 114/162 |
| 3,875,885 A | * | 4/1975 | Balquet et al. | 114/67 A |
| 4,096,817 A | * | 6/1978 | Bordat | 114/280 |
| 4,510,879 A | * | 4/1985 | Weaver et al. | 114/162 |
| 4,515,101 A | * | 5/1985 | Akerblom | 114/162 |
| 4,609,360 A | * | 9/1986 | Whitehead | 440/69 |
| 4,973,275 A | * | 11/1990 | Jarvi et al. | 440/66 |
| 4,979,917 A | * | 12/1990 | Haynes | 440/38 |
| 5,090,352 A | * | 2/1992 | Stanford | 114/67 A |
| 5,117,882 A | * | 6/1992 | Stanford | 114/67 A |
| 5,513,149 A | * | 4/1996 | Salmi et al. | 367/1 |
| 5,787,829 A | * | 8/1998 | Oshima | 114/67 A |
| 6,543,719 B1 | * | 4/2003 | Hassan et al. | 244/17.13 |
| 6,789,492 B2 | * | 9/2004 | Latorre | 114/67 A |
| 6,860,770 B2 | * | 3/2005 | Hassan et al. | 440/38 |
| 2001/0022152 A1 | * | 9/2001 | Takahashi | 114/67 A |
| 2002/0029731 A1 | * | 3/2002 | Takahashi | 114/67 A |
| 2013/0036964 A1 | * | 2/2013 | Lin | 114/67 A |

* cited by examiner

*Primary Examiner* — Lars A Olson
*Assistant Examiner* — Jovon Hayes
(74) *Attorney, Agent, or Firm* — Rosenberg, Klein & Lee

(57) ABSTRACT

The present invention relates to a rudder resistance reducing method which utilizes a negative pressure to guide in gas for generating air bubbles, reducing the resistance of the rubber of a boat. The present invention uses an air bubble generator in front of the rudder for generating bubbles during rotation of the propeller of the boat to cause a high-speed flow of water without changing the original design of the boat, enabling the air bubbles to isolate contact between the high-speed flow of water and the rudder, thereby reducing rudder resistance and saving energy consumption.

4 Claims, 4 Drawing Sheets

RUDDER RESISTANCE REDUCING METHOD

BACKGROUND OF THE INVENTION

1. Field of the Invention

The present invention relates to heat sink technology and more particularly, to rudder performance technology and more particularly, to a rudder resistance reducing method, which utilizes a negative pressure to guide in gas for generating air bubbles, reducing the resistance of the rubber of a boat.

2. Description of the Related Art

A boat, except the boat body, has attachments and gears hung on the outside of the boat body. For example, a boat 10 shown in FIG. 1 comprises a boat body 11, a propeller 13 pivotally connected to the boat body 11 below the water line 12, and an attachment, for example, a rudder 14 arranged at the boat 10 at a rear side relative to the propeller 13 for controlling the steering direction of the boat.

Referring to FIG. 2, during rotation of the propeller 13 of the aforesaid boat 10, a flow of water is produced that passes through the rudder 14. As the rudder 14 is disposed at the downstream of the flow of water caused by the propeller 13, a resistance will be produced against the steering direction of the board. Further, because the rudder 14 is a requisite attachment of the boat 10, resistance will be inevitably produced against the rudder 14 during rotation of the propeller 13 to cause a high-speed flow of water.

Conventional methods for reducing the aforesaid resistance are commonly to modify the streamline design of the rudder or surface treatment without affecting the structural strength of the rudder. However, these methods cannot achieve a significant effect in reducing the rudder resistance.

Therefore, it is desirable to provide a measure for reducing rudder resistance in an economic manner, minimizing fuel gas consumption.

SUMMARY OF THE INVENTION

The present invention has been accomplished under the circumstances in view. It is the main object of the present invention to provide a rudder resistance reducing method, which uses an air bubble generator in front of the rudder for generating bubbles during rotation of the propeller of the boat to cause a high-speed flow of water without changing the original design of the boat, enabling the air bubbles to isolate contact between the high-speed flow of water and the rudder, thereby reducing rudder resistance and saving energy consumption.

A rudder resistance reducing method, comprising the steps of:

a) providing a boat comprising a propeller rotatable to drive said boat to steer and a rudder installed in said boat body at a rear side relative to said propeller;

b) installing an air bubble generator in said boat at a front side relative to said rudder, said air bubble generator comprising an air tube arranged at the water face of said rudder and defining at least one gas inlet and opposing pairs of gas release outlets;

c) providing a gas guide device comprising at least one guide pipe, said at least one guide pipe having a bottom end thereof connected to said at least one gas inlet of said air tube and a top end thereof terminating in an intake hole;

d) employing Bernoulli's principle to produce a negative pressure in said gas release outlets for sucking in outside air for generating air bubbles during rotation of said propeller to cause a high-speed flow of water;

e) enabling the intake flow of air/gas to be guided by said at least one guide pipe into said at least one gas inlet of said air tube and then discharged out of said gas release outlets to mix with water and to produce multiple air bubbles; and f) utilizing the air bubbles thus produced to isolate a part of the high-speed flow of water and said rudder and to reduce friction contact between the high-speed flow of water and said rudder and to further reduce the resistance of said rudder against the high-speed flow of water.

Further, a gas guide device is used for guiding air or gas into the air bubble generator. The gas guide device uses a supplementary measure to guide engine waste gas or low pressure gas from the steam turbine into the gas guide device for generating air bubbles.

Further, the gas guide device further compresses a pressure device for pumping a gas into the gas geode device. The pressure device can be selected from an air compressor, an air blower, an engine, a steam turbine and a turbo of the boat.

DETAILED DESCRIPTION OF THE PREFERRED EMBODIMENT

Further features and benefits of the present invention will be apparent from the following detailed description of the preferred embodiment taken in conjunction with the annexed drawings. However, it is to be understood that the invention is applicable to any of a variety of boats. The present preferred embodiment is simply an example but not a limitation.

Figure 1:
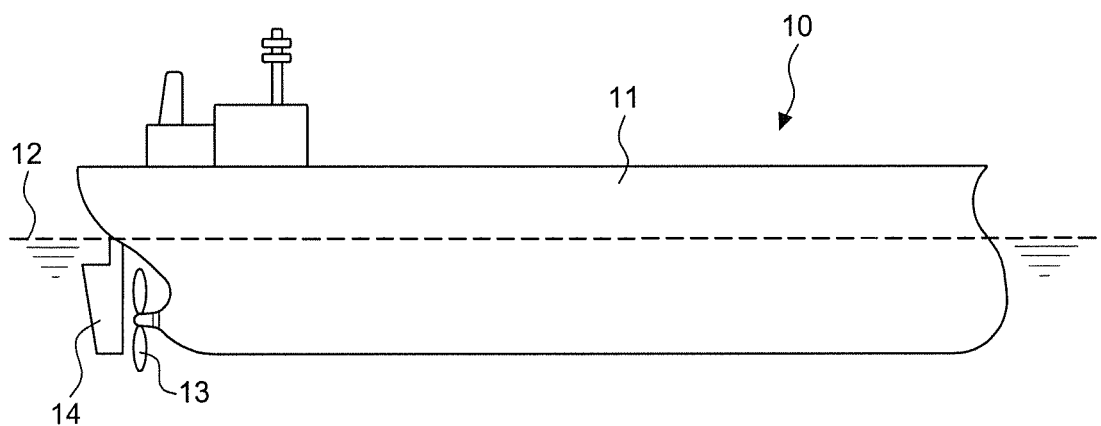
FIG. 1 is a schematic drawing illustrating an arrangement of a rudder in a conventional boat.
Figure 2:
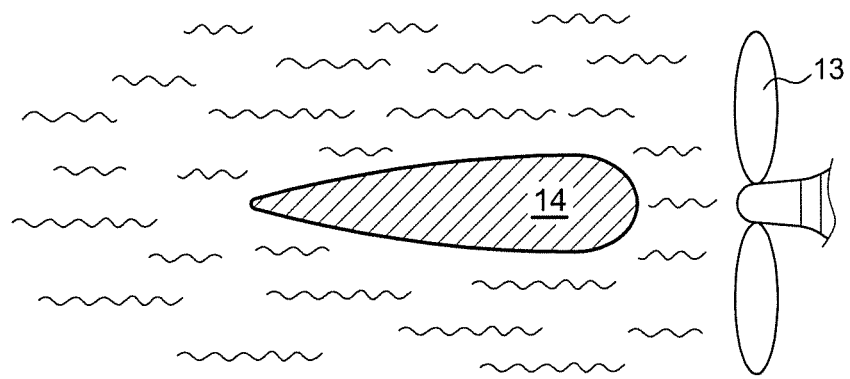
FIG. 2 is a schematic drawing illustrating a flow of water caused and passed over the rudder during rotation of the propeller according to the prior art.
Figure 3:
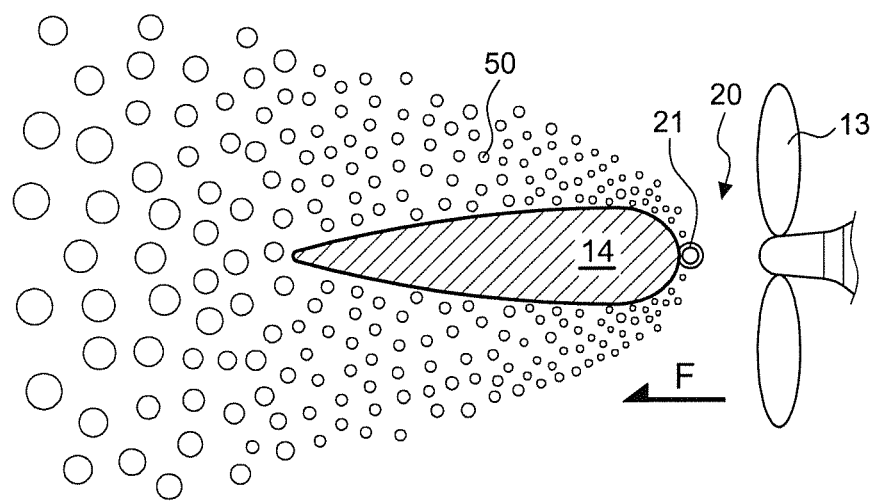
FIG. 3 is a schematic drawing illustrating air bubbles generated in the flow of water caused and passed over the rudder during rotation of the propeller according to the prior art.
Figure 4:
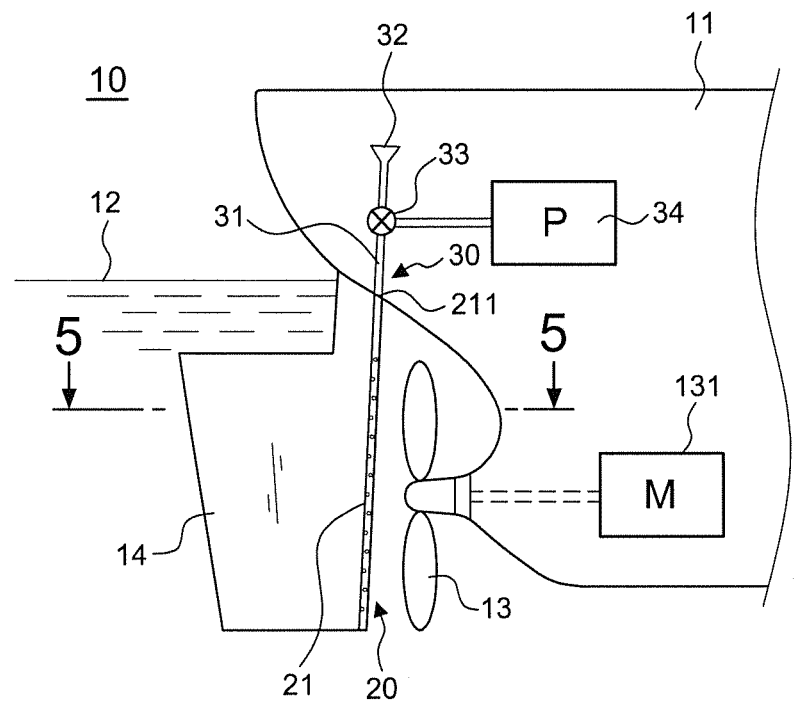
FIG. 4 is a schematic drawing illustrating the arrangement of the gas guide device in the boat in accordance with the present invention.
Figure 5:
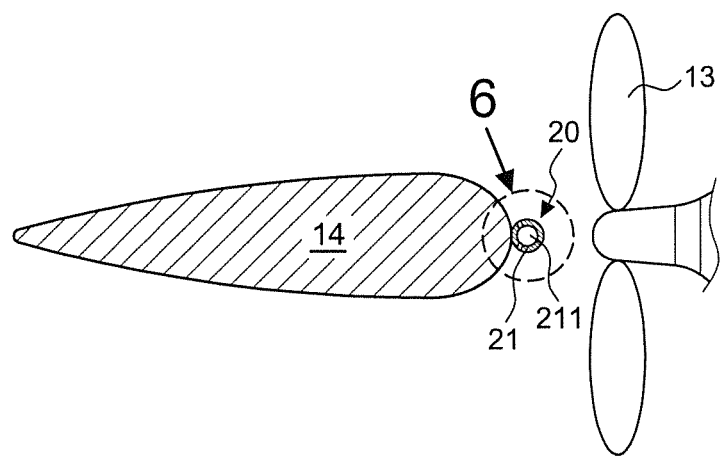
FIG. 5 is a sectional view taken in an enlarged scale along line 5-5 of FIG. 4.
Figure 6:
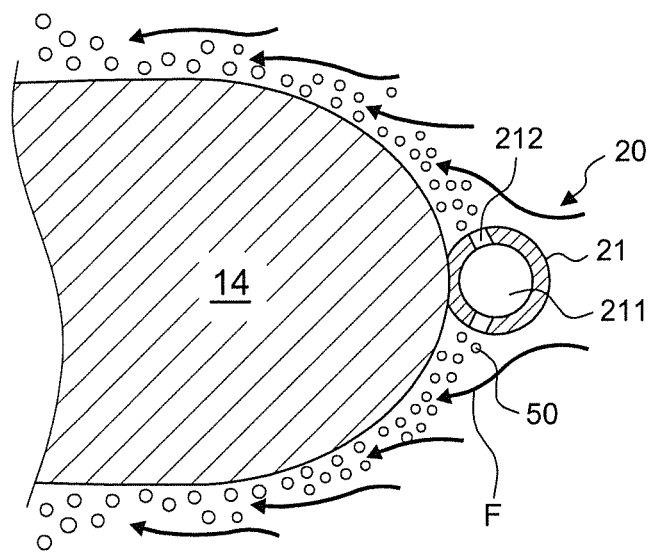
FIG. 6 is an enlarged view of the major part of FIG. 5, illustrating generation of air bubbles in the negative pressure.
Figure 7:
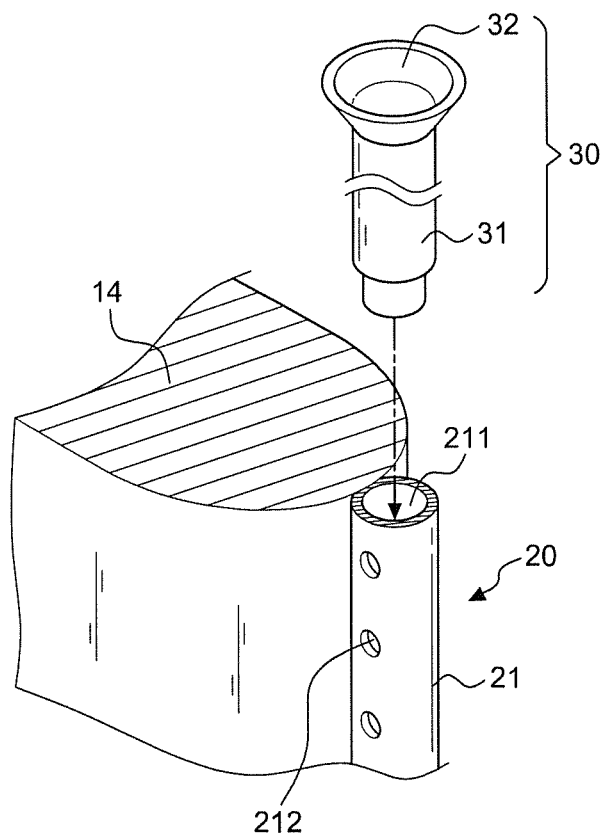
FIG. 7 is an exploded elevational view of the air bubble generator shown in FIG. 6.

Referring to FIGS. 3-6, when compared to the surface resistance of the rudder 14 of the prior art design shown in FIG. 2, multiple air bubbles, as shown in FIG. 3, are generated in the flow of water that is produced during steering of the board to reduce rudder resistance. The rudder resistance reducing method in accordance with the preferred embodiment of the present invention, as shown in FIGS. 4 and 5, comprises the steps of:

a) providing a boat 10 comprising a boat body 11, a propeller 13 pivotally mounted in the boat body 11, a power engine 131 for rotating the propeller 13 to cause a high-speed flow of water F, and a rudder 14 installed in the boat body 11 at a rear side relative to the propeller 13;

b) installing an air bubble generator 20 in the boat body 11 at a front side relative to the rudder 14, wherein the air bubble generator 20, as shown in FIGS. 6 and 7, comprises an air tube 21, which is, for example, but not limited to, a circular tube arranged at the water face of the rudder 14 and defines at least one gas inlet 211 and opposing pairs of gas release outlets 212 in, for example, circular shape; the air tube 21 can be formed integral with the rudder 14 and processed to provide the gas release outlets 212 during fabrication of the boat 10, or alternatively, the air tube 21 can be separately made and then affixed to the water face of the rudder 14 without destructing the structural strength of the rudder 14;

c) providing a gas guide device 30, which, as shown in FIG. 4, comprises at least one guide pipe 31 that has its bottom end connected to the at least one gas inlet 211 of the air tube 21 and its top end terminating in an intake hole 32 that is disposed in the boat body 11 or above the water line 12;

d) employing Bernoulli's principle to produce a negative pressure in the gas release outlets 212 for sucking in outside air for generating air bubbles 50 during rotation of the propeller 13 and steering of the boat body 11 to cause the aforesaid high-speed flow of water F that strikes the water face of the rudder 14; as the high-speed flow of water F flows at a high speed during rotation of the propeller 13, a high negative pressure can be produced in the gas release outlets 212 to suck in outside air for generating air bubbles 40 without power consumption;

e) enabling the intake flow of air to be guided by the at least one guide pipe 31 into the at least one gas inlet 211 of the air tube 21 and then discharged out of the gas release outlets 212 to mix with water and to produce multiple air bubbles 50; and f) utilizing the air bubbles 50 thus produced, as shown in FIG. 3, to isolate a part of the high-speed flow of water F and the rudder 14 and to reduce friction contact between the high-speed flow of water F and the rudder 14 and to further reduce the resistance of the rudder 14 against the high-speed flow of water that is produced during rotation of the propeller 13.

As the resistance of water is about 700~800 times greater than air, using the air bubbles 50 to reduce contact between the high-speed flow of water and the rudder 14 can effectively reduce the resistance, the more the isolation of the contact between the high-speed flow of water and the rudder 14 the better the resistance reducing effect will be.

Based on the aforesaid technical measure for generating air bubbles 50, the invention simply needs to install an air bubble generator 20 in front of the rudder 14 without using any power drive or changing the original design of the boat.

Referring to FIG. 4, the existing resources of the boat body 11 may be utilized for pumping air or gas into the at least one guide pipe of the gas guide device, for example, a pressure device 34 may be connected to the at least one guide pipe 31 of the gas guide device 30 and a control valve 33 may be set between the at least one guide pipe 31 and the pressure device. The pressure device 34 is adapted for pumping air, engine waste gas or waste gas from the steam turbine in the boat body 11 into the at least one guide pipe 31.

Further, the pressure device 34 can be the existing air compressor, air blower, engine or steam turbine in the boat body 11. The resource recycling of directly guiding the waste gas from the engine or steam turbine of the boat does not require any extra resources or increase the cost. Further the waste gas from the engine or steam turbine can also be used to drive a turbo for pumping air or gas toward the gas release outlets 212. Further using an air flower or the like to make the pressure device 34 requires less power to pump air or gas for generating air bubbles 50 that isolate contact between the high-speed flow of water and the rudder 14 to reduce rudder resistance. Thus, using a small amount of power can achieve multiple times of power. Further, the pressure device 34 can be prepared by using existing resources to directly guide air or gas or to compress air or gas into the e gas release outlets.

In conclusion, by means of arranging an air bubble generator 20 in the boat body 11 at a front side relative to the rudder 14 and employing the Bernoulli's principle in hydrodynamics that an increase in the velocity of a stream of fluid results in a decrease in pressure, the invention guides in air or gas to generate air bubbles 50 for isolating contact between the high-speed flow of water and the rudder to reduce rudder resistance.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A rudder resistance reducing method, comprising the steps of:
  a) providing a boat comprising a propeller rotatable to drive said boat to steer and a rudder installed in said boat body at a rear side relative to said propeller;
  b) installing an air bubble generator in said boat at a front side relative to said rudder, said air bubble generator comprising an air tube arranged to extend externally along a leading edge of said rudder, said air tube having formed therein at least one gas inlet and opposing pairs of gas release outlets communicating with the gas inlet;
  c) providing a gas guide device comprising at least one guide pipe, said at least one guide pipe having a bottom end thereof connected to said at least one gas inlet of said air tube and a top end thereof terminating in an intake hole;
  d) employing Bernoulli's principle to produce a negative pressure in said gas release outlets for sucking in outside air for generating air bubbles externally about said rudder during rotation of said propeller to cause a high-speed flow of water externally around said rudder;
  e) enabling the intake flow of air/gas to be guided by said at least one guide pipe into said at least one gas inlet of said air tube and then discharged out of said gas release outlets to mix with water and to produce multiple air bubbles; and
  f) utilizing the air bubbles thus produced to displace portions of the high-speed flow of water away from an external surface of said rudder to reduce friction contact between the high-speed flow of water and said rudder and thereby reduce the resistance of said rudder against the high-speed flow of water.

2. The rudder resistance reducing method as claimed in claim 1, wherein the intake hole at the top end of said at least one guide pipe is disposed in the boat or above the water line.

3. The rudder resistance reducing method as claimed in claim 2, wherein engine waste gas or low pressure gas from the steam turbine is guided into said at least one guide pipe of said gas guide device for generating air bubbles.

4. The rudder resistance reducing method as claimed in claim 3, wherein said gas guide device further comprises a pressure device for pumping a gas into said at least one guide pipe toward said at least one gas release outlet, said pressure device being selected from an air compressor, an air blower, an engine, a steam turbine and a turbo of the boat.

* * * * *